Patented Oct. 8, 1935

2,016,299

UNITED STATES PATENT OFFICE 2,016,299

CARBOHYDRATE DERIVATIVE AND PROCESS OF MAKING THE SAME

Ferdinand Schulze, Waynesboro, Va., assignor to E. I. du Pont de Nemours & Company, Wilmington, Del., a corporation of Delaware No Drawing. Application January 9, 1934, Serial No. 705,898

9 Claims. (Cl. 260—100)

This invention relates to carbohydrate derivatives, more particularly to cellulose derivatives, and even more particularly to cellulose derivatives of sulfuric acid.

United States Patent 1,734,291 to Gebauer-Fulnegg describes the preparation of cellulose sulfate by the use of chlorosulfonic acid on cellulose in the presence of pyridine. Traube in various patents discloses the direct addition of sulfur trioxide to cellulose and in British Patent 322,003 discloses the use of a diluent in carrying out the reaction.

This invention has as an object the preparation of carbohydrate derivatives of sulfuric acid of good quality, as indicated by the high viscosity of their solutions, by a method simple, effective and uncomplicated by the formation of colored by-products difficult of removal. A further object is the preparation of sulfuric acid derivatives of cellulose of similar high quality. Other objects will appear hereinafter.

These objects are accomplished by the following invention wherein sulfur trioxide is reacted with cellulose in the presence of a tertiary amine such as pyridine. The reaction may take place at perhaps 100° C. and the product may be isolated by dissolving the reaction mixture in water and coagulating the reaction product by the addition of alcohol. The following examples illustrates the invention but are not limitative thereof.

Example I

One part by weight of sulfur trioxide is distilled into ten parts by weight of pyridine and about ½ part by weight of cellulose in the form of small strips of filter paper is added. The mixture is heated to 100° C. until the cellulose is dissolved and the product then isolated.

Example II 17.1 parts by weight of sulfur trioxide are distilled into 40 parts by weight of pyridine with cooling. 17 parts by weight of pyridine are then added to get a partial solution of the addition product. 5.3 parts by weight of cotton linters pulp are then added and the mixture heated to 90° C. for three days. The pulp swells greatly but does not dissolve. The reaction product is dissolved in water, precipitated by pouring into alcohol while stirring, washed with ether to remove the alcohol, and dried, for example, in a desiccator over sulfuric acid.

The following comparative experiments were carried out to illustrate the difference between the process of the present invention and that of the prior art. Example III represents a prior art process, Example IV the process of the present invention.

Example III 548 parts of pyridine were mixed with 232 parts by weight (2 mols.) of chlorosulfonic acid and the mixture thus obtained heated with 50 parts by weight of cotton linters pulp at 100° C. for about one hour. The cellulose swelled and a red color developed quite rapidly after a few minutes, the color becoming deeper until it was almost black. The color was removable only with difficulty and long continued extraction or repeated reprecipitation.

Example IV 548 parts by weight of pyridine were mixed with 160 parts by weight of sulfur trioxide (2 mols.) and the mixture thus obtained heated with 50 parts by weight of cotton linters pulp for about one hour at 100° C. The cotton swelled but no color developed, in contrast with the prior art process of Example III.

As starting material any of the ordinary varieties of cellulose may be used including wood pulp, cotton linters, hydro- or oxy-cellulose and partially substituted cellulose derivatives such as low substituted methyl, ethyl or benzyl cellulose, low substituted cellulose acetate, cellulose propionate, glycol cellulose, and cellulose glycollic acid. Other polymeric carbohydrates or carbohydrate derivatives such as inulin, mannan, chitin, glycogen, or starch may be used. A great many tertiary amines may replace the pyridine of the examples thus the lutidines, collidines, picolines, conyrine, diethyl-p-toluidene, quinoline, and dimethyl-p-xylidine are effective. Pyridine-type tertiary amines are, however, much more effective than other tertiary amines and for this reason represent a preferred embodiment of the invention.

The temperature of the reaction may be varied from about 50 to about 150° C. although a temperature of about 100° C. to 120° C. is preferred. The reaction may be carried out under pressure and thus even higher temperatures may be employed. The time of reaction varies with the temperature and the desired degree of esterification. In order to secure a water soluble product, test samples may be taken and the reaction stopped when the desired solubility is obtained. The product may be fibrous in the reaction mixture or it may be in solution depending on the time and temperature of the reaction and the amount of reagents used. The Examples I and II illustrate these features.

It is convenient to promote solubility of the cellulose sulfate in the reaction bath by the addition of suitable catalysts such as the hydrochlorides of the pyridine-type tertiary amines, the hydrobromides thereof, and quaternary ammonium salts such as ethylpyridinium chloride or bromide or benzylpyridinium chloride or bromide which promote the reaction by producing swelling of the cellulose and which also have a solubilizing effect on the cellulose.

The cellulose sulfate obtained according to the process of the present invention is useful in general as the cellulose sulfate of the prior art but in addition is especially suitable for those purposes where the low viscosity or color contamination of prior art cellulose sulfates have rendered these undesirable. Thus, it may be used as a dispersing agent, as a sizing material, or as an intermediate in the formation of other cellulose derivatives.

The present process is advantageous in affording a simple and effective method of obtaining a cellulose sulfate of a low degree of degradation in a state susceptible of easy purification, differentiating in these two respects from the processes of the prior art.

As many apparently widely different embodiments of this invention may be made without departing from the spirit and scope thereof, it is to be understood that I do not limit myself to the specific embodiments thereof except as defined in the appended claims.

I claim:

1. Process for the preparation of sulfuric acid derivatives of carbohydrates comprising reacting sulfur trioxide with a material containing a polymeric carbohydrate nucleus and free hydroxyl groups in the presence of a tertiary amine.

2. Process for the preparation of sulfuric acid derivatives of carbohydrates comprising reacting sulfur trioxide with a material containing a polymeric carbohydrate nucleus and free hydroxyl groups in the presence of a tertiary amine of the pyridine type.

3. Process for the preparation of sulfuric acid derivatives of cellulose comprising reacting sulfur trioxide with a material containing the cellulose nucleus and free hydroxyl groups in the presence of a tertiary amine.

4. Process for the preparation of sulfuric acid derivatives of cellulose comprising reacting sulfur trioxide with a material containing the cellulose nucleus and free hydroxyl groups in the presence of a tertiary amine of the pyridine type.

5. Process for the preparation of sulfuric acid derivatives of cellulose comprising reacting sulfur trioxide with cellulose in the presence of a tertiary amine.

6. Process for the preparation of sulfuric acid derivatives of cellulose comprising reacting sulfur trioxide with cellulose in the presence of a tertiary amine of the pyridine type.

7. Process for the preparation of sulfuric acid derivatives of cellulose comprising reacting sulfur trioxide with cellulose at a temperature of 50 to 150° C. in the presence of a tertiary amine of the pyridine type.

8. Process for the preparation of sulfuric acid derivatives of cellulose comprising reacting sulfur trioxide with cellulose at a temperature of 50 to 150° C. in the presence of pyridine.

9. Process for the preparation of sulfuric acid esters of cellulose comprising reacting approximately 160 parts by weight of sulfur trioxide with approximately 50 parts by weight of cellulose at a temperature of 100 to 120° C. in the presence of approximately 548 parts by weight of pyridine for approximately one hour.

FERDINAND SCHULZE.